(12) United States Patent
Karabchevsky

(10) Patent No.: US 11,592,596 B2
(45) Date of Patent: Feb. 28, 2023

(54) SYSTEM AND METHOD FOR CREATING AN INVISIBLE SPACE

(71) Applicant: B.G. Negev Technologies & Applications Ltd., at Ben-Gurion University, Beer-Sheva (IL)

(72) Inventor: Alina Karabchevsky, Lehavim (IL)

(73) Assignee: B.G. Negev Technologies & Applications Ltd. at Ben-Gurion University, Beer-Sheva (IL)

( * ) Notice: Subject to any disclaimer, the term of this patent is extended or adjusted under 35 U.S.C. 154(b) by 406 days.

(21) Appl. No.: 16/647,906

(22) PCT Filed: Sep. 17, 2018

(86) PCT No.: PCT/IL2018/051043
§ 371 (c)(1),
(2) Date: Mar. 17, 2020

(87) PCT Pub. No.: WO2019/058368
PCT Pub. Date: Mar. 28, 2019

(65) Prior Publication Data
US 2020/0278476 A1    Sep. 3, 2020

Related U.S. Application Data

(60) Provisional application No. 62/560,223, filed on Sep. 19, 2017.

(51) Int. Cl.
*G02B 1/00* (2006.01)
(52) U.S. Cl.
CPC ........ *G02B 1/002* (2013.01); *G02B 2207/101* (2013.01); *G02B 2207/107* (2013.01)

(58) Field of Classification Search
CPC ........ G02B 1/002; G02B 1/005; G02B 1/007; G02B 2207/101; G02B 2207/107;
(Continued)

(56) References Cited

U.S. PATENT DOCUMENTS 9,394,166 B1 * 7/2016 Sechrist ................ G02B 1/002
9,677,856 B2    6/2017 Pendry et al.
(Continued)

FOREIGN PATENT DOCUMENTS

CN    106249321 A    12/2016

OTHER PUBLICATIONS

International Search Report for Serial No. PCT/IL2018/051043 dated Jan. 14, 2019.
(Continued)

*Primary Examiner* — Stephone B Allen
*Assistant Examiner* — Adam W Booher
(74) *Attorney, Agent, or Firm* — McCormick, Paulding & Huber PLLC

(57) ABSTRACT

The invention relates to a method for creating a space of invisibility, which comprises: (a) providing a metamaterial plate having a subwavelength thickness, said metamaterial plate having bottom and top surfaces; (b) radiating the bottom surface of the metamaterial plate by a primary radiation thereby to form a space of invisibility above the top surface of the metamaterial plate, said space of invisibility being located within a space of a secondary radiation above the metamaterial plate which is in turn formed as a result of said primary radiation passing through metamaterial plate.

13 Claims, 9 Drawing Sheets

(58) Field of Classification Search
CPC .......... H01Q 15/00; H01Q 15/14; H01Q 3/44; F41H 3/00; G01S 7/38
See application file for complete search history.

(56) References Cited

U.S. PATENT DOCUMENTS

| | | | |
|---|---|---|---|
| 2010/0156573 A1* | 6/2010 | Smith | ............... H01P 3/081 333/239 |
| 2010/0225562 A1 | 9/2010 | Smith | |
| 2015/0116187 A1 | 4/2015 | Smith et al. | |
| 2016/0025956 A1 | 1/2016 | Choi et al. | |

OTHER PUBLICATIONS

Extended European Search Report for European Patent Application No. EP 18 85 9711 dated May 4, 2021.

Galutin Y., et al., "Invisibility cloak scheme with composite plasmonic waveguides and metsurface overlayers", 2017 Progress in Electromagnetics Research Symposium—Spring (PIERS), IEEE, May 22, 2017 (May 22, 2017), pp. 2809-2812, XP033302166, DOI: 10.1109/PIERS.2017.8262231 [retrieved on Jan. 16, 2018].

Orazbayev B., et al., "Metasurface-based ultrathin carpet cloak", 2016 10th European Conference on Antennas and Propagation (EUCAP), European Association of Antennas and Propagation, Apr. 10, 2016 (Apr. 10, 2016), pp. 1-3, XP032906218, DOI: 10.1109/EUCAP.2016.7481262 [retrieved on May 31, 2016].

Ni X., et al., "An ultrathin invisibility skin cloak for visible light", Science, vol. 349, No. 6254, Sep. 18, 2015 (Sep. 18, 2015), pp. 1310-1314, XP055433080, US, ISSN: 0036-8075, DOI: 10.1126/science.aac9411.

Qiluan Cheng et al., "Directionally hiding objects and creating illusions above a carpet-like device by reflection holography", Nature Scientific Reports 5, Article No. 8581, Feb. 2015.

Yun Lai et al., "A complementary media invisibility cloak that can cloak objects at a distance outside the cloaking shell" Department of Physics, The Hong Kong University of Science and Technology, Clear Water Bay, Kowloon, Hong Kong, China, Apr. 2009.

* cited by examiner

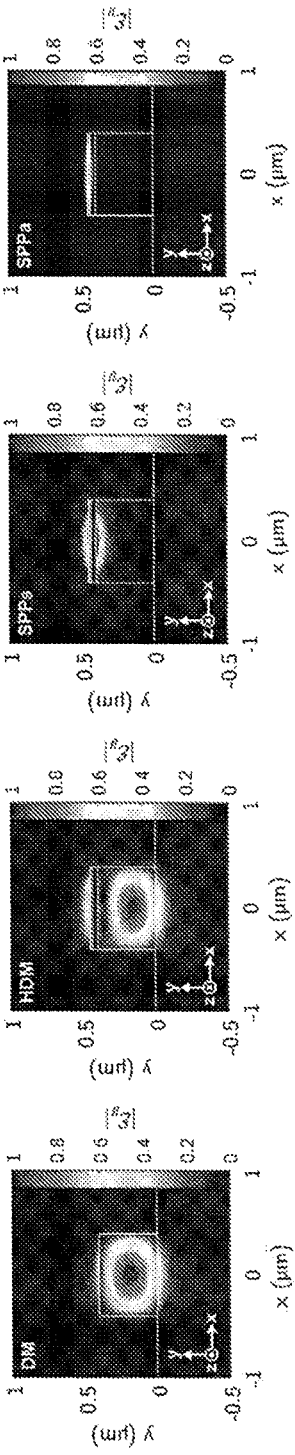
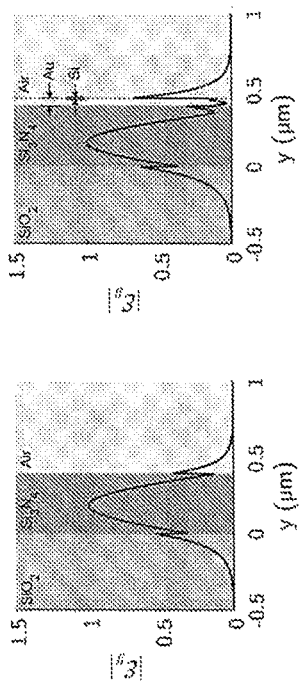

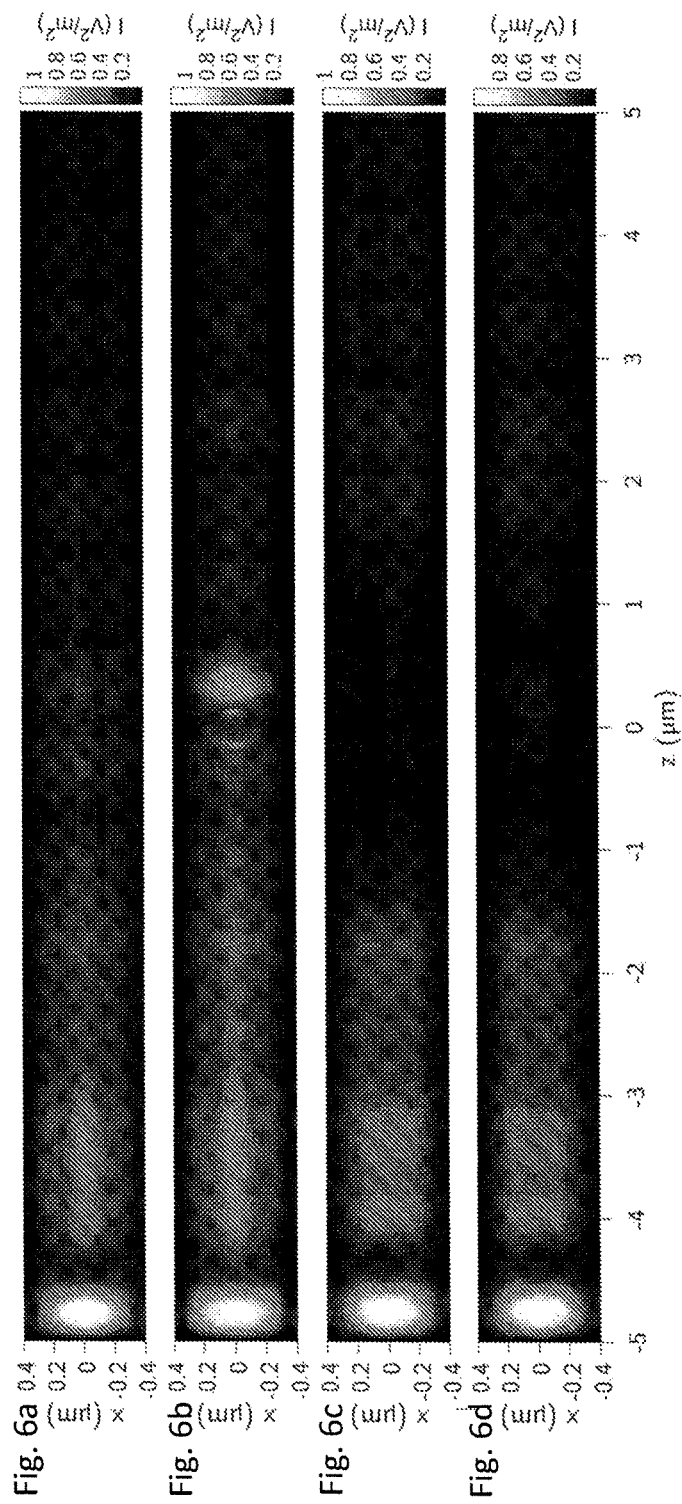

SYSTEM AND METHOD FOR CREATING AN INVISIBLE SPACE

CROSS-REFERENCE TO RELATED APPLICATIONS

This application is a National Stage application of International Patent Application No. PCT/IL2018/051043, filed on Sep. 17, 2018, which claims priority to United States Patent Application No. 62/560,223, filed on Sep. 19, 2017 each of which is hereby incorporated by reference in its entirety.

TECHNICAL FIELD

The invention relates in general to the field of optical, electromagnetic, and acoustic waves, and to their effects on solid objects.

BACKGROUND

Metamaterials are materials that are man-made engineered to have properties that are not found in nature. For example, they may be made from assemblies of multiple elements fashioned from composite materials such as metals or plastics. The one or more materials forming the metamaterial are usually arranged in repeating patterns, at scales that are smaller than the wavelengths of the phenomena they influence. Metamaterials derive their properties not from the properties of the original materials, but rather from their newly designed structures. Their precise shape, geometry, size, orientation and arrangement gives them unique properties capable of manipulating waves: by blocking, absorbing, enhancing, or bending waves, metamaterials achieve benefits that go beyond what is possible with conventional (natural) materials. Metamaterials that are engineered from material composites have exotic electromagnetic properties that do not exist in nature, and are achieved through sub-wavelength structuring.

The concept of an invisibility cloak with metamaterials has been a topic of interest over the last few centuries. The recent developments in metamaterial science and nanotechnology have enabled the possibility of cloaking an object to become a technological reality. One approach to achieve an invisibility cloak is by use of transformation optics.

Silicon photonics integrated circuits are considered to enable future computing systems with optical input-outputs co-packaged with CMOS chips to circumvent the limitations of electrical interfaces. For example, the silicon based photonic integrated circuits are widely used in applications such as optical modulators, optical interconnects, biosensors, and more. A metamaterial overlayer, or simply a meta-surface on an integrated photonic structure, allows for nurturing the device with novel functionalities. The introduction of meta-surfaces (metamaterial layers) simplifies the design of metamaterial structures due to its characteristic thickness, which is typically much smaller than the wavelength. This essentially converts the design process to two dimensional. One of the most appealing applications of meta-surfaces is achieving invisibility cloaks by tailoring evanescent fields. This can be allowed in a controllable manner using an integrated photonics platform.

The prior art has suggested concealing an object by wrapping or covering it by a metamaterial layer. Waves that radiate the wrapping metamaterial layer cannot reach the object, therefore the object becomes invisible. The wrapping metamaterial layer in itself is also invisible, therefore both the metamaterial layer and the object are "invisible" or undetectable. However, the prior art has failed to teach the hiding of an object which is neither wrapped nor covered by the metamaterial, in a space which is exposed to radiation passing through the metamaterial. For example, the prior art has failed to teach hiding of an object which is positioned above a metamaterial layer.

The term "invisible" used herein means that the object is not "seen", namely undetectable in the relevant wavelength, whether the relevant waves are in the electromagnetic range or in the acoustic range.

Composite plasmonic waveguides incorporating dielectric and metallic films offer a great potential for ultra-compact integrated photonic devices, due to a substantial increase of the propagation distance of the plasmon waves. Surface plasmons (SP) are a type of surface waves that extend along a metal-dielectric interface, considering the momentum matching conditions. The surface plasmons benefit from spatial confinement and high local field intensity. One of the major limitations in the implementation of plasmonic circuits is their short propagation length. Composite plasmonic waveguides provide large confinement of light in a sub-wavelength scale. They also allow for the control of the surface plasmons excited in the metal overlayer, while substantially reducing inevitable ohmic losses of conventional plasmonic materials.

Qiluan Cheng, Kedi Wu, Yile Shi, Hui Wang & Guo Ping Wang—"Directionally hiding objects and creating illusions above a carpet-like device by reflection holography", Nature Scientific Reports 5, Article number: 8581 (2015), teaches an object cloaking above a carpet layer and creation of an illusion of transforming one object into another one. However, this is done by use of reflection holography techniques rather than by use of a metamaterial layer.

Yun Lai, Huanyang Chen, Zhao-Qing Zhang and C. T. Chan "A complementary media invisibility cloak that can cloak objects at a distance outside the cloaking shell" Department of Physics, The Hong Kong University of Science and Technology, Clear Water Bay, Kowloon, Hong Kong, China, teaches an "invisibility cloak" which can hide an object of a pre-specified shape and size at a certain distance from the layer. However, the cloaking technique in this publication requires a layer which is "complementary" (i.e., "anti-object") to the hidden object. More specifically, each designed layer directly depends and can hide only one specific object. This publication fails to teach a single "general purpose" layer that can hide objects of any shape, i.e., various shapes that are independent from the structure of the metamaterial layer.

SUMMARY

The invention relates to a method for creating a space of invisibility, which comprises: (a) providing a metamaterial plate having a subwavelength thickness, said metamaterial plate having bottom and top surfaces; (b) radiating the bottom surface of the metamaterial plate by a primary radiation thereby to form a space of invisibility above the top surface of the metamaterial plate, said space of invisibility being located within a space of a secondary radiation above the metamaterial plate which is in turn formed as a result of said primary radiation passing through metamaterial plate.

In an embodiment of the invention, any object which is positioned within said space of invisibility becomes invisible to a device which is positioned within any space above said metamaterial plate.

In an embodiment of the invention, the metamaterial plate becomes invisible in view of said primary and secondary radiations.

In an embodiment of the invention, the metamaterial plate comprises perforations.

In one embodiment, the method further comprises the providing of a spacer layer above said metamaterial plate.

In an embodiment of the invention, said radiation includes either electromagnetic or acoustic waves.

In an embodiment of the invention, said electromagnetic waves are in the light spectrum range.

In an embodiment of the invention, said spectrum light range is in the visible spectrum range.

In an embodiment of the invention, the metamaterial plate is made of gold.

In an embodiment of the invention, a nano-spacer layer which is made of silicon is provided above said metamaterial plate which is made of gold.

In an embodiment of the invention, the metamaterial plate and the nano-spacer layer include perforations, each of the perforations passes through both the meta-material plate and through the nano-spacer.

In an embodiment of the invention, said metamaterial plate lays on top of a waveguide, wherein said primary radiation is a plasmonic radiation provided to the metaterial via a top facet of the waveguide.

BRIEF DESCRIPTION OF THE DRAWINGS

The invention is illustrated by way of examples in the accompanying drawings, in which similar references consistently indicate similar elements and in which:

FIG. 1b shows the actual view as seen by the viewing device of the system of FIG. 1a;

FIG. 5(a) and FIG. 5(e) show the field profile of a purely dielectric mode (DM) supported by the dielectric waveguide in the z<−L/2 and z>L/2 regions of the simulation scheme of FIG. 3;

FIGS. 5(b) and 5(f) show the profile of the fundamental hybrid mode supported by the composite dielectric/plasmonic waveguide for −L/2<z<L/2 of the simulation scheme of FIG. 3;

FIGS. 5(c) and 5(g) show the profiles of the $SPP_s$ in the simulation scheme of FIG. 3;

FIGS. 5(d) and 5(h) show the $SPP_a$ modes (SPP asymmetric mode—$SPP_a$), supported by the thin metal ridge waveguide;

FIG. 6a shows calculated spatial surface intensities as viewed by the viewing device of the scheme of FIG. 3, with a metamaterial plate (layer) made of gold while no object exists, nor radiation is applied;

FIG. 6b shows calculated spatial surface intensities as viewed by the viewing device of the scheme of FIG. 3, while an object having an optical index of 1.3 is placed on the metamaterial plate made of gold, and while no radiation is applied;

FIG. 6c shows calculated spatial surface intensities as viewed by the viewing device of the scheme of FIG. 3, while no object is placed on the metamaterial plate, and while primary radiation is applied via the waveguide to the bottom of the metamaterial plate;

FIG. 6d shows calculated spatial surface intensities as viewed by the viewing device of the scheme of FIG. 3, while an object having an optical index of 1.3 is placed on the metamaterial plate, and while primary radiation is applied via the waveguide to the bottom of the metamaterial plate.

DETAILED DESCRIPTION

In the most general terms, the present invention provides a method and system for causing an object of any shape which is positioned above a metamaterial plate (layer), and which is radiated by electromagnetic or acoustic waves coming from below the plate, to be "invisible" (namely, undetectable in the relevant radiation wave-range). For the sake of brevity, the following discussion and examples are all related to the electromagnetic-visible light range. However, this should not be viewed as a limitation, as the system and method of the invention are applicable within any wave-range, mutatis mutandis. Furthermore, the terms "above" and "below" are referred herein for the sake of convenience of reference only, as the system in its entirety may be rotated to any direction, and in this rotated orientation these terms may no longer reflect the "above" and "below" orientations.

Figure 1A:
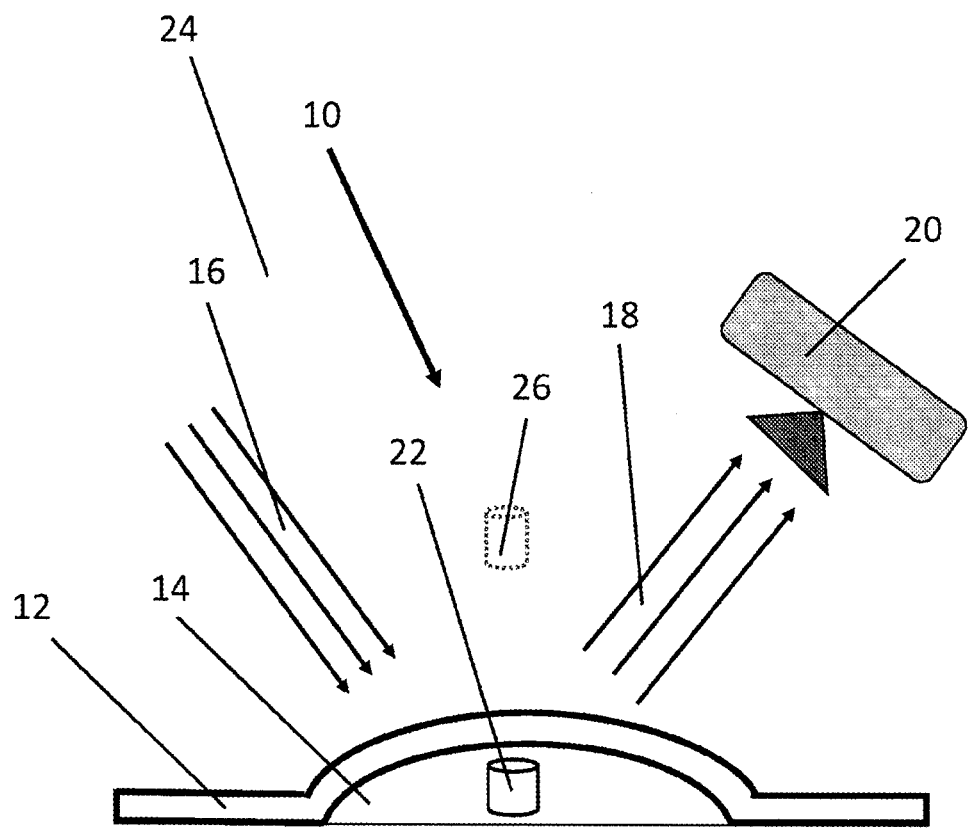
FIG. 1a schematically illustrates a prior art cloaking carpet system.
Figure 1B:
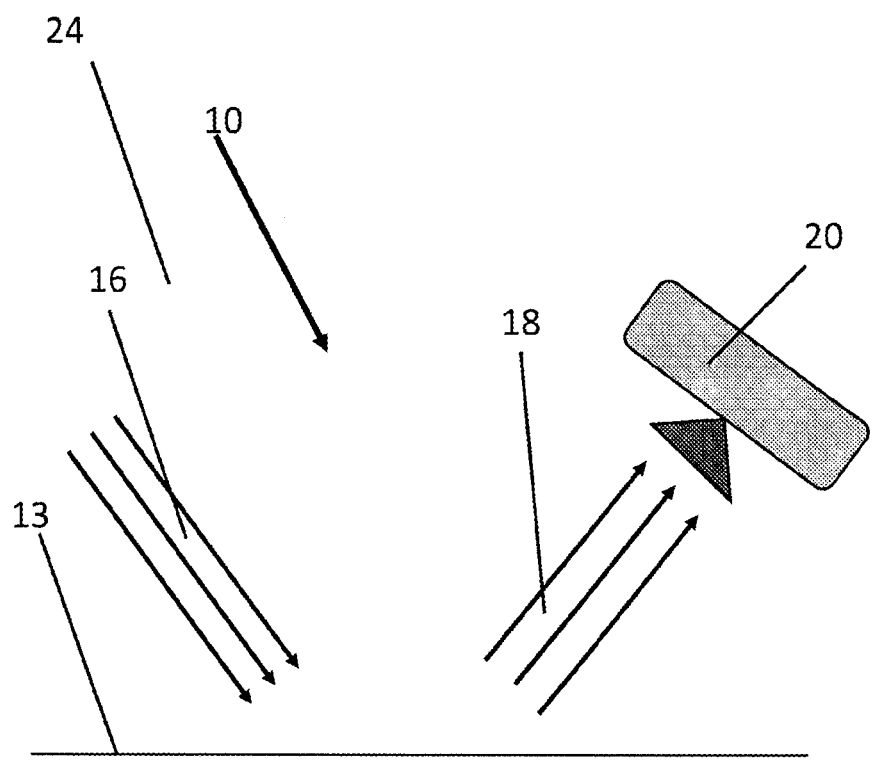

FIG. 1a schematically illustrates a prior art cloaking carpet system 10 for concealing an object 22 which is positioned within a hiding space underneath the carpet. Carpet 12, which is made of metamaterial, has a curved cross-section, forming a hiding space 14 underneath. Electromagnetic radiation 16, for example, light rays in the visible range, that radiate the surface of carpet 12 are fully or partially scattered 18 from the carpet towards viewing device 20. The waves may be partially absorbed by the carpet, however, in such a manner that the radiation does not reach the hiding space 14. In view of this full or partial dispersion of the light rays with no light penetration to the hiding space 14, any object 22 which is positioned within the hiding space 14 becomes invisible to any optical device (or a human eye, if the light is in the visible range) which is located within the active space 24 above the carpet. The metamaterial carpet, having permeability and permittivity characteristics that do not exist in natural materials, is also designed to manipulate the light such that the carpet 12 itself becomes invisible as well. In fact, the manipulation of the metamaterial of carpet 12 causes the viewing device 20 to view a virtual flat surface 13—shown in FIG. 1b, rather than the carpet 12. However, in this prior art system 10, any object 26 that may be positioned anywhere above carpet 12, i.e., within the active space 24, will be visible to viewing device 20.

Figure 2A:
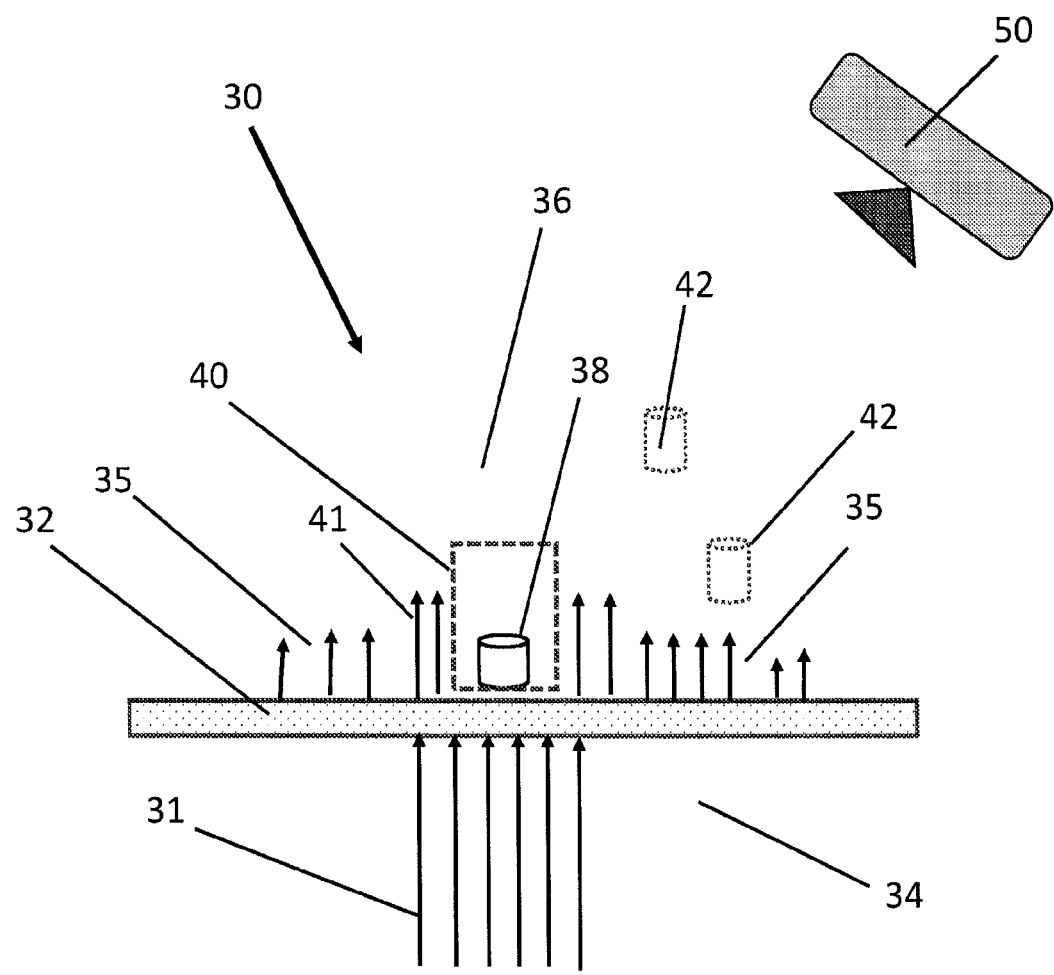
FIG. 2a schematically illustrates a concealing system according to a first embodiment of the present invention.

FIG. 2a schematically illustrates a concealing system 30 for creating a space of invisibility above a metamaterial plate 32, according to an embodiment of the present invention. Primary electromagnetic radiation 31 which is formed within a primary space of radiation 34 below the metamaterial plate 32, penetrates and passes through the metamaterial plate towards the space 36 above the metamaterial plate. The passing radiation 41 forms a space of secondary radiation 35 above the metamaterial plate 32. It has been surprisingly found that a space of invisibility 40 which is masked from the electromagnetic radiation 41 that passes through the metamaterial plate 32 is created within a portion of space 36, and within the space of secondary radiation 35. Any object 38 which is positioned within the space of invisibility 40 is not exposed to photons that result from the primary radiation 31. Therefore, this object is invisible to the viewing device 50 (or human eye, if the radiation is in the visible range), which is positioned anywhere within the space 36 above the metamaterial plate. However, any object 42 which is positioned elsewhere within the space 36 (i.e., at any location excluding the space of invisibility 40) is visible to the viewing device 50. In other words, an appropriate design of the metamaterial plate 32 can produce a "space of invisibility" 40 above the metamaterial plate, a space which is masked from any radiation which is originated within the space 34 below the metamaterial plate 32 and passes through this metamaterial plate to form a space of secondary radiation 35. Moreover, an important feature of the invention is that the metamaterial plate 32 is in itself invisible to the viewing device 50.

The metamaterial 32 prevents the evanescent tails (i.e., the secondary radiation 42) from interacting with the object 38, leading to the object's invisibility. Typically (but not necessarily), the thickness of the metamaterial plate 32 is several orders smaller than the wavelength A of the primary radiating wave 31.

Figure 2B:
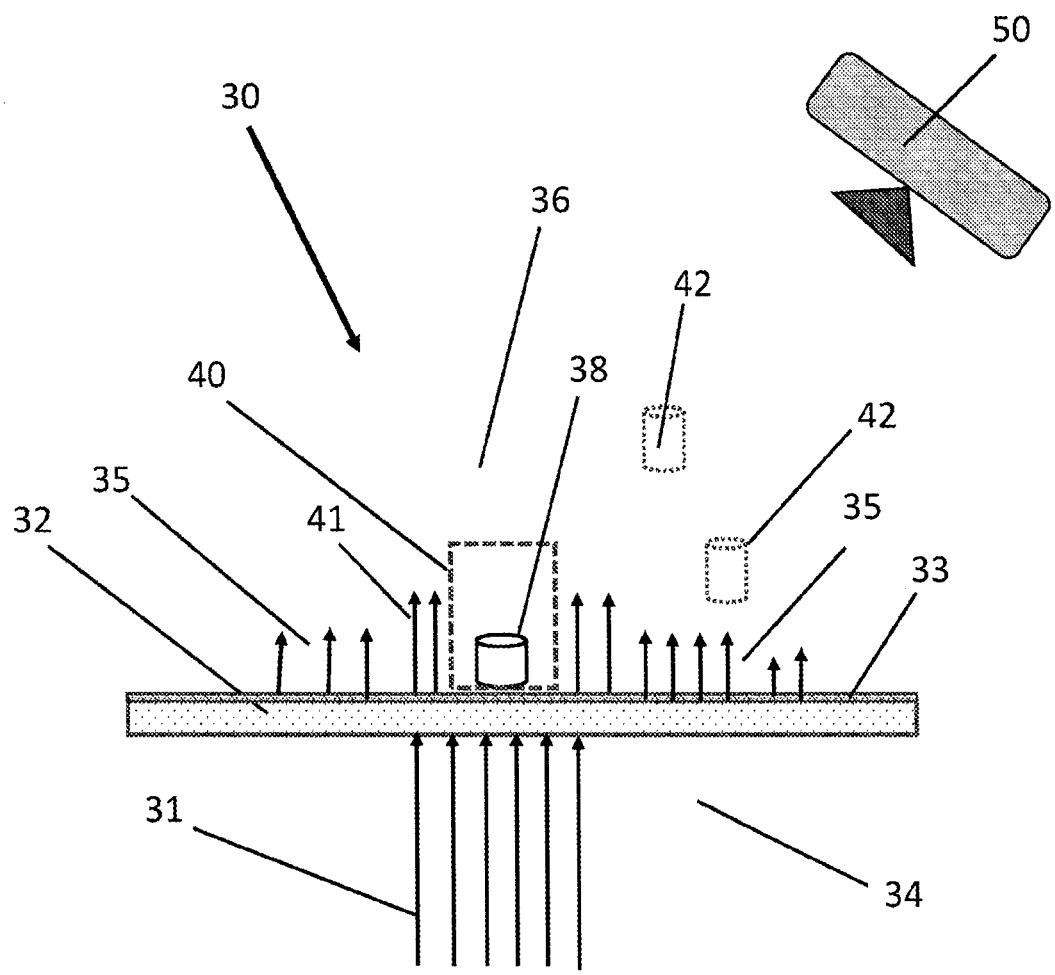
FIG. 2b schematically illustrates a concealing system according to a second embodiment of the present invention.

In an embodiment of the invention shown in FIG. 2b, the concealing system of the invention further includes a spacer layer 33 (hereinafter, "nano-spacer") above the metamaterial plate, which is used to amplify the radiation that passes the metamaterial plate. This amplification even further emphasizes the concealing phenomenon, as while the secondary radiation 41 above the metamaterial plate 32 is amplified, still this radiation does not affect the invisibility of any object 38 which is positioned within the space of invisibility 40. In still another embodiment, the spacer layer 33 also assists in deflection of the radiation away from the space of invisibility 40.

The applicability of the concealing system of the invention was demonstrated in a simulation. The simulation was based on a semi-analytical model of orthonormalization of complex eigenmodes at an abrupt step, developed for the investigation of the transmission and surface intensity in composite plasmonic waveguide structures.

Figure 3:
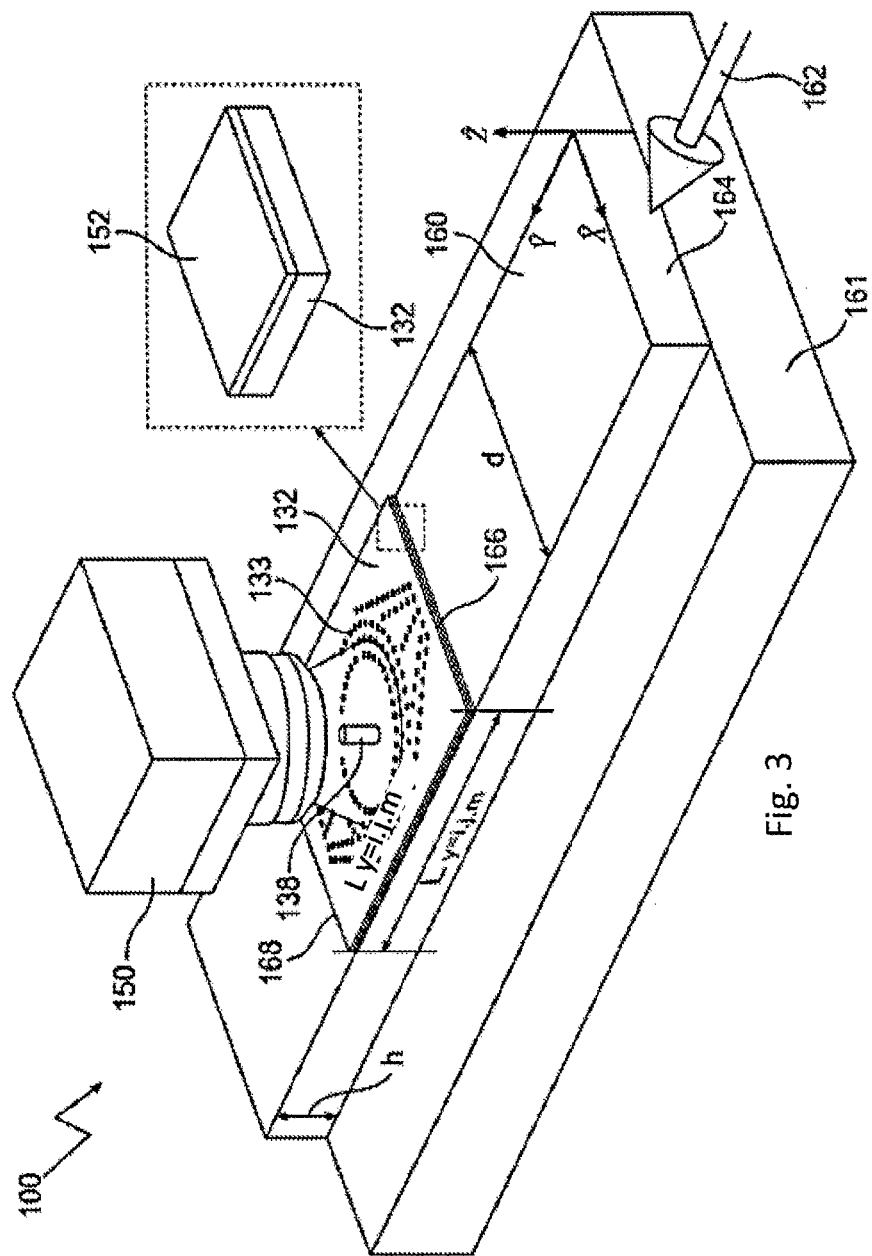
FIG. 3 shows a simulation scheme for the system of FIG. 2b.

FIG. 3 shows a structure of a simulation scheme 100 which demonstrates the applicability of the invention. A metamaterial plate 132 was applied on a top surface of a waveguide (for example, ridge waveguide) 160. A nano-spacer coating layer 152 was applied on the top surface of the metamaterial plate 132. An object 138 was placed above the metamaterial plate 132, and a camera 150 viewed the space above the metamaterial plate 132, including the object and at least the portion of the metamaterial plate 132 where the object was located. The metamaterial plate 132, as well as the nano-spacer layer 152 above it included perforations 133, each perforation passing through both the metamaterial plate and through the nano-spacer.

The waveguide 160 was made from a dielectric $Si_3N_4$ and its width d was 800 nm, while its height h was 400 nm. The waveguide 160 was placed on a silicon dioxide $SiO_2$ substrate 161.

The metamaterial plate 132 was made of a perforated gold layer, having a length L of 10 μm, width of 800 nm, and height of 40 nm. The coating nano-spacer layer 152 had the same width and length as of the metamaterial plate 132, with a height of 10 nm. A cylindrical scattering object with an optical index of 1.3 and having a diameter of 70% from the waveguide width was placed on the metamaterial plate 132 (in fact, on the nano-spacer 152 attached to it).

A monochromatic radiation 162 at a wavelength $\lambda_0$=637 nm was provided at an input facet 164 of the waveguide 160, exciting a first fundamental guided mode $E_{i0}$. The propagated radiation faced a first step of discontinuity upon reaching the edge 166 of the metamaterial plate 132. The radiation faced a second step of discontinuity at the farther edge 168 of the plate 132. Therefore, the radiation in fact faced three different regions: A fundamental mode guided region 0 up to edge 166 of the metamaterial plate 132, region 1 which is characterized by the combination of the meta-surface of plate 132 and the nano-spacer 152, and region 2 which is identical to the region 0 in terms of the optical properties and functionality. A first plasmonic interaction was therefore created at the interface between the surface of the metamaterial plate 132 and the top surface of the waveguide 160, and a second plasmonic interaction was created at the interface between the top surface of the nano-spacer 152 and the air above it.

At the interface separating the dielectric of the waveguide 160 having permittivity Ed and the gold metal of the metamaterial layer 132 having a permittivity $\varepsilon_m$, significant surface plasmons were excited by the coupling between free carriers of the metal and the incident electromagnetic field under momentum matching conditions.

In the composite plasmonic waveguide structure of FIG. 3, the guided fundamental mode couples to the multiple modes excited in region 1, which is initiated by the discontinuity with the meta-surface overlayer. The use of CMOS-technology compatible ridge waveguide in combination with the meta-surface provided a design flexibility in on-chip light manipulations with novel surface plasmons-based photonic circuits. The Si dielectric nano-spacer 152 added an additional degree of freedom for light confinement for coupling into hybrid plasmonic modes. In view of this arrangement, a concentrated secondary radiation 41 in a direction perpendicular to the main direction of propagation within the waveguide was produced above the metamaterial plate 132, however, with a masked space of invisibility 40 as will be demonstrated hereinafter.

The metamaterial layer 132 can be designed using transformation optics. Although the general concepts of metamaterials were designed considering propagating waves, meta-surfaces can be used to control waves in the near field regime, such as surface plasmons. The design may consider a transformation which maps a rectangular region in a virtual system to an arbitrary region (the cloak, i.e., the space of invisibility) in the physical system. As previously stated, the layer can potentially be electromagnetically transformed by changing the material properties of the medium. That means it is possible to change the coordinate system of the object, in order to obtain a new refractive index distribution which presents the same electromagnetic properties. Mathematically, this transformation can be realized by modifying the dielectric and magnetic properties of the materials described by the following relations:

$$\varepsilon'=A\varepsilon A^T/\det(A), \qquad (1a)$$

$$\mu'=A\mu A^T/\det(A), \qquad (1b)$$

where ε and ρ are the dielectric and magnetic constants in the original space, and ε' and μ' are the same constants in the transformed one. A is the Jacobian transformation matrix which relates the coordinates between the physical and virtual systems and given by:

$$A = \begin{bmatrix} \partial x'/\partial x & \partial x'/\partial y & \partial x'/\partial z \\ \partial y'/\partial x & \partial y'/\partial y & \partial y'/\partial z \\ \partial z'/\partial x & \partial z'/\partial y & \partial z'/\partial z \end{bmatrix} \quad (2)$$

Where (x, y, z) are the coordinates of the physical space and (x', y', z') are of the virtual space. To simplify the design, it can be assumed that $\mu'=\mu=1$ symmetry along the x axis and consider a 2-dimensional transformation in the x-z plane with no change along the y axis. If the mapping satisfies the Cauchy-Riemann conditions which for this case are given by:

$$\partial x'/\partial x = \partial z'/\partial z, \quad (3a)$$

$$\partial x'/\partial z = -\partial z'/\partial x, \quad (3b)$$

the transformed material becomes inhomogeneous and isotropic. To generate the discrete coordinate transformation, the boundaries of the physical domain are first defined by:

$$-5 \le z \le 5 \text{ and } \begin{cases} 0.2\cos^2(\pi z/4)^2 & -2 \le z \le 2 \\ 0 \le x \le 0.4 & \text{otherwise} \end{cases}. \quad (4)$$

Figure 4:
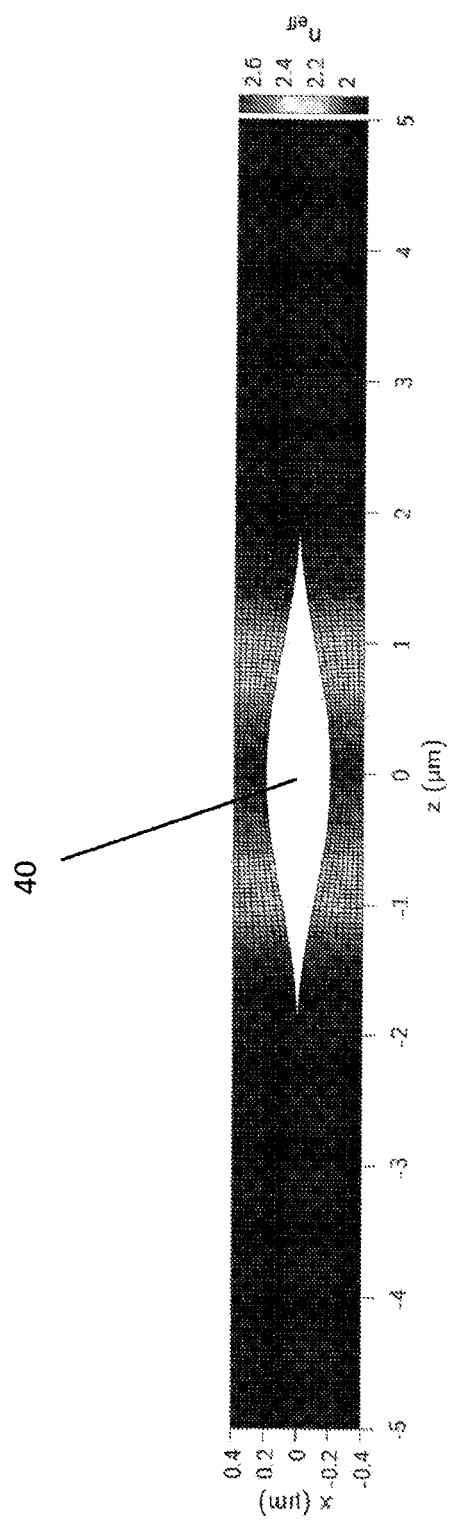
FIG. 4 shows a transformed mesh using quasi-conformal transformation theme (black mesh) and calculated effective mode index $n_{eff}$.

To satisfy (3), the bounded area is divided into a mesh with 235×9 blocks and mapped using quasi-conformal (QC) transformation scheme. The grid is numerically generated using an iterative algorithm that solves the discrete partial ecliptic differential equations generated by substituting (3) into (2) using successive over-relaxation (SOR) method. The resulting orthogonal domain is then replicated at the bottom half space ($-0.4 \le x \le 0$) and represented by the black mesh as shown in FIG. 4, which shows a transformed mesh using quasi-conformal transformation theme (black mesh) and calculated effective mode index, $n_{eff}$. Since the mesh of FIG. 4 is orthogonal and satisfies (3), the permittivity tensor in (1) becomes a scalar matrix and the effective mode index is $n_{eff} = \sqrt{\varepsilon'} = \sqrt{\varepsilon \det A}$ represented by the color-map of FIG. 4. FIG. 4 shows a transformed mesh using quasi-conformal transformation theme (black mesh) and calculated effective mode index, $n_{eff}$.

The method of the invention can conceal an object 138 of an arbitrary shape if the object's longest dimension is less than the white hiding area 40 shown in FIG. 4. In addition, it has been found that the invention is feasible for objects made of different materials, such as dielectrics or metals.

FIGS. 5a-5h show the dominant y-component of the electric field magnitude supported by the waveguide for an Si nano-spacer of 10 nm height. FIG. 5(a) and FIG. 5(e) show the field profile of the purely dielectric mode (DM) supported by the dielectric waveguide in the z<−L/2 and z>L/2 regions. FIG. 5(b) and FIG. 5(f) show the profile of the fundamental hybrid mode supported by the composite dielectric/plasmonic waveguide for −L/2<z<L/2. Hybrid plasmonic/dielectric mode (HDM) results as a combination of dielectric mode (DM) and a symmetric surface plasmon polariton (SPP) mode ($SPP_s$) supported by the adjacent thin metal ridge waveguide. FIG. 5(c) and FIG. 5(g) show the profiles of the $SPP_s$ and FIGS. 5(d) and 5(h) show the $SPP_a$ modes (SPP asymmetric mode–$SPP_a$), supported by the thin metal ridge waveguide.

The nature of the modes depends on the optical properties of the waveguide structure and materials. They are localized in different areas of the waveguide. The region 1 is illuminated by the DM (pure dielectric mode), which is the fundamental guided mode supported by the waveguide. Between the steps of the discontinuity in the scheme of FIG. 3, resonance occurs when the DM matches the $SPP_s$—together they create the HDM. $SPP_a$ mode is a short-range surface plasmon mode and compared to the symmetric mode, the asymmetric $SPP_a$ mode penetrates much deeper to the metal film.

During operation, the fundamental dielectric mode illuminates the waveguide overlapped with the meta-surface of the effective permittivity of the metamaterial plate. To confirm the existence of the cloak, namely the space of invisibility 40, the integrated total surface intensity I over the waveguide width and along the interaction length L in the propagation direction was calculated, as shown in FIG. 6 while I is:

$$I = \left| \sum_{\eta=x,y,z} E_\eta(x, y_s, z) \right|^2 = \left| \sum_{\eta=x,y,z} \sum_{\gamma=i,j,m} c_{i0,\gamma 1} \mathscr{E}_{\eta,\gamma 1,d}(x, y_s, z) \right|^2. \quad (5)$$

$E_{y1}(x,y,z)$ are extracted complex vectorial electric and magnetic field components calculated using a finite-difference time-domain method (FDTD). With the surface intensity/integrated across the plasmonic overlayer along the length from z=−L/2 to z=L/2 and full width of the waveguide. i, j, m indicate guided modes which are HDM, $SPP_s$ and $SPP_a$ respectively, $c_{i0},\gamma 1$ is the expansion coefficient, and η is the electric field components in x,y,z directions.

Integrated surface intensity is an essential parameter to assess the effectiveness of the evanescent invisibility cloak of the invention having a composite plasmonic waveguide. FIGS. 6a-6d show 3D colormaps of $|E\eta|^2$ for four different cases, more specifically, the calculated spatial surface intensities $|Ey(x,z)|^2$ at $y=y_s$ in the composite plasmonic waveguide. The integrated surface intensity of the composite plasmonic waveguide 160 with a slab (metamaterial plate 132) of gold overlayer is shown on FIG. 6a. FIG. 6b shows the I calculated distribution on the composite plasmonic waveguide with a slab of gold overlayer while an object having a cylindrical shape and index of 1.3 is placed on it. The object 138 boundaries are visible due to the scattering effect as a result of the interaction with evanescent fields. Around the object, a hybrid dielectric mode (HDM) shows a strong localization across the metamaterial overlayer which results in observed increased intensity. The invention is aimed to prevent the field localization around this object. The waveguide 160 with the transformed metamaterial overlayer (i.e., with the metamaterial plate 132 radiated by the radiation propagating in the waveguide) is shown in FIG. 6c. The resulting view for the waveguide with transformed metamaterial overlayer together with the object above it is shown in FIG. 6d. Due to the carefully designed invisibility cloak (space of invisibility 40) in the simulated system, the scattering effect from the object is avoided and invisibility space is clearly demonstrated in FIG. 6d.

In one embodiment of the invention, the thickness of the Si nano-spacer 152 is varied in order to change the effective mode index of the HDM mode. This variation of the thickness of the Si nano-spacer 152 can be performed as an alternative to a spatial variation of the refractive index of the gold film (the metamaterial plate 132). In fact, the easiest realization of the cloaking device is to fabricate the nano-spacer while the height of the nano-spacer varies according to the change of the index of refraction. Correlating the properties of the structure with the calculated gradient index distribution can be physically realized by using gray-scale lithography techniques. This technique enables tailoring of the topology of the dielectric layer (namely, the Si nano-spacer) height, adjacent to the gold surface to obtain the cloaking effect.

Figure 7:
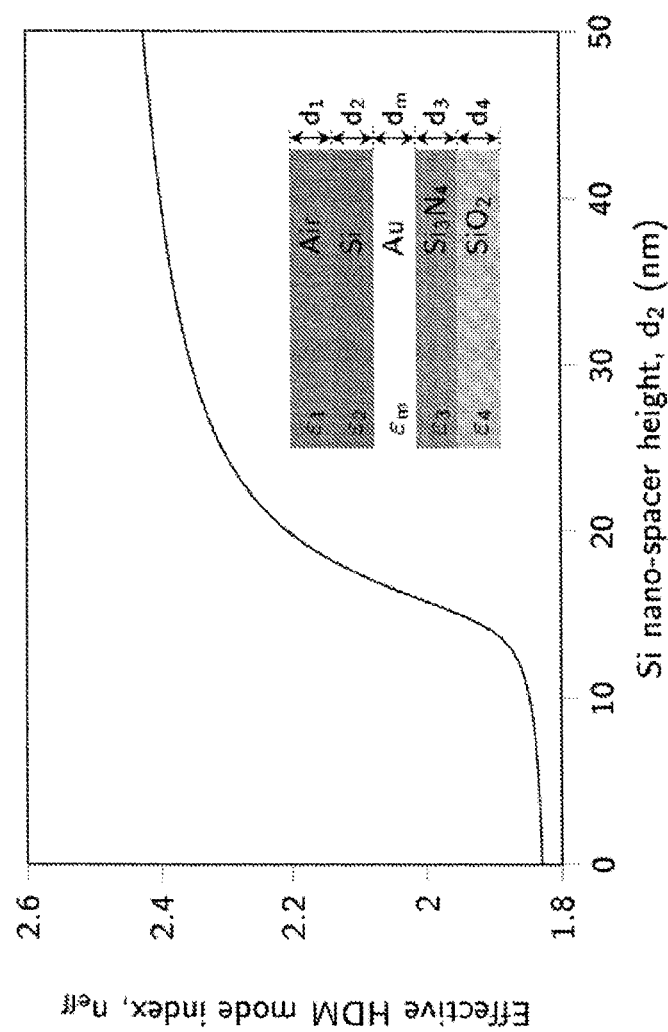
FIG. 7 shows the five material layers in the scheme of FIG. 3, and the effective HDM index vs. the height of the nano-spacer layer.

The fabrication procedure of the embodiment of FIG. 3 is relatively simple. In a first manufacturing step the $Si_3N_4$ waveguide 160 is created on an $SiO_2$ substrate 161. This can be done by etching a slab of $Si_3N_4$ to the required dimensions. Then, a Poly(methyl methacrylate—PMMA) photoresist is spin coated on the $Si_3N_4$ ridge waveguide 160, and the perforations pattern 133 is created using electron-beam (e-beam) lithography. The gold is then deposited on the area exposed to the e-beam and then the Si thin film of the nano-spacer layer 152 is deposited on top of the gold layer (metamaterial plate 132). For the creation of the specific pattern required for the device, the varying thickness of the Si nano-spacer 152 is achieved using a lift-off process. The resulting structure consists of five layers with their corresponding dielectric constants and widths, respectively, as shown in FIG. 7. The wave equation has to be satisfied in each distinct region. Solving the equation results in an implicit expression for the dispersion relation linking the propagation constant of $\beta$ the mode and the angular frequency $\omega$. The effective mode index of the HDM mode, defined as $n_{eff}=\beta/k_0$, is obtained by numerically solving the structure for different heights of the Si nano-spacer layer as shown in FIG. 7.

It is possible to achieve the modes at the beginning of the gold-coated region (1), and the fundamental mode excited at the input region (0) in order to determine the entire composite waveguide by applying appropriate mode-matching conditions at the input (z=0) and output (z=L) interfaces of the dielectric rib waveguide and the composite dielectric/metallic stripe waveguide. It can be assumed that the guided pure dielectric mode, DM (designated by a subscript $i_0$) exists in region 0 (which extends from the input facet 164 and up to the edge 166 of the metamaterial plate 132) and in region 2 (which extends from the edge 168 of the metamaterial plate 132 and up to the output of the waveguide 160). Orthogonal guided modes $\gamma_1$=i1, j1 or m1 are assigned to HDM (hybrid plasmonic/dielectric mode) relating to the cross-sections shown, for example, in FIG. 3(b), and in FIG. 3(c) and $SPP_a$ in FIG. 3(d) modes, respectively, in the output side (dielectric waveguide with plasmonic overlayer) of the first step as 166 shown in FIG. 3, with quasi-transverse magnetic components. At z=0, the general complex field distributions at the boundary between region 0 and region 1, ignoring the reflected and radiated modes, are:

$$E_{\xi i0} = \sum_{\gamma=i,j,m} E_{\xi\gamma 1} \text{ and } H_{\xi i0} = \sum_{\gamma=i,j,m} H_{\xi\gamma 1}. \tag{6}$$

Where $\xi$=x,y and $E=E_x\hat{x}+E_y\hat{y}+E_z\hat{z}$ and $H=H_x\hat{x}+H_y\hat{y}+H_z\hat{z}$, x, y and z are unit vectors in the x, y and z directions respectively. An expression for the expansion coefficient between input mode i1 in region 0 and mode j1 in region 1 is derived using the complex orthogonality principle:

$$\int_{-\infty}^{\infty}\int_{-\infty}^{\infty}(E_{i0}\times H_{\gamma 1})_z+(E_{\gamma 1}\times H_{i0})_z dxdy = \int_{-\infty}^{\infty}\int_{-\infty}^{\infty}(E_{\gamma 1}\times H_{\gamma 1})_z+(E_{\gamma 1}\times H_{\gamma 1})_z dxdy. \tag{7}$$

Where $\gamma_1$=i1,j1,m1. General complex electric and magnetic field distribution components are now expressed:

$$E_\delta(x,j,z)=a_\delta \mathscr{E}_\delta(x,y)\exp(-j\beta_\delta z) \tag{8}$$

And $$H_\delta(x,j,z)=a_\delta \mathscr{H}_\delta(x,y)\exp(-j\beta_\delta z). \tag{9}$$

Where $\beta_\delta$ is the propagation constant of mode $\delta$. $\mathscr{E}_\delta(x,y,z)$ and $\mathscr{H}_\delta(x,y,z)$ are extracted complex vectorial electric and magnetic field components calculated using FEM and $\mathscr{E}=\mathscr{E}_x\hat{x}+\mathscr{E}_y\hat{y}+\mathscr{E}_z\hat{z}$ and $\mathscr{H}=\mathscr{H}_x\hat{x}+\mathscr{H}_y\hat{y}+\mathscr{H}_z\hat{z}$, $a_\delta=N_\delta A_\delta=E_\delta(x,y,z)/(\mathscr{E}_\delta(x,y)\exp(-j\beta_\delta z))=H_\delta(x,y,z)/(\mathscr{H}_\delta(x,y)\exp(-j\beta_\delta z))$ and $A_\delta$ is complex, $A_\delta=|A_\delta|\exp(-j\phi_\delta)$ related to the power carried by the mode as: $P_\delta=|A_\delta|^2$. The normalization factor $N_\delta$ giving rise to each mode carrying unity power. $P_\delta$=1 is: $N_\delta=(2/\Re(\int_{-\infty}^{\infty}\int_{-\infty}^{\infty}(\mathscr{E}_{67}\times\mathscr{E}_{\gamma 1})_z dxdy))^{1/2}$. For z=0 these are:

$$a_{i0}\mathscr{H}_{\xi i0} = \sum_{\gamma=i,j,m} a_{\gamma 1}\mathscr{H}_{\xi\gamma 1}; a_{i0}\mathscr{E}_{\xi i0} = \sum_{\gamma=i,j,m} a_{\gamma 1}\mathscr{E}_{\xi\gamma 1}. \tag{10}$$

The power in any region is defined as:

$$P=\tfrac{1}{2}\Re\int_{-\infty}^{\infty}\int_{-\infty}^{\infty}(\mathscr{E}\times\mathscr{H}^*)_z dxdy. \tag{11}$$

A relation between eigenmodes at an abrupt step is detailed below. By substituting (8) and (9) into (7) it can be obtained:

$$a_{i0}a_{\gamma 1}\int_{-\infty}^{\infty}\int_{-\infty}^{\infty}(\mathscr{E}_{i0}\times\mathscr{H}_{\gamma 1})_z+(\mathscr{E}_{\gamma 1}\times\mathscr{H}_{i0})_z dxdy = a_{\gamma 1}^2\int_{-\infty}^{\infty}\int_{-\infty}^{\infty}(\mathscr{E}_{\gamma 1}\times\mathscr{H}_{\gamma 1})_z+(\mathscr{E}_{\gamma 1}\times\mathscr{H}_{\gamma 1})_z dxdy. \tag{12}$$

To obtain a relation between eigenmodes at an abrupt step:

$$a_{i0}(I_{i0,\gamma 1}+I_{\gamma 1,i0})=a_{\gamma 1}2I_{\gamma 1,\gamma 1}, \tag{13}$$

And $$a_{\gamma 1}=a_{i0}(I_{i0,\gamma 1}+I_{\gamma 1,i0})/(2I_{\gamma 1,\gamma 1}). \tag{14}$$

Where $$I_{i,\gamma}=\int_{-\infty}^{\infty}\int_{-\infty}^{\infty}(\mathscr{E}_{i x}\times\mathscr{H}_{\gamma y})_z dxdy=\int_{-\infty}^{\infty}\int_{-\infty}^{\infty}(\mathscr{E}_{xi}\mathscr{H}_{y\gamma}-\mathscr{E}_{yi}\mathscr{H}_{x\gamma})_z dxdy. \tag{15}$$

$N_\delta$ can then be expressed as:

$$N_\delta=(2/\Re(I_{\delta,\delta}))^{1/2}, \tag{16}$$

Which is:

$$A_{\gamma 1}N_{\gamma 1}=A_{i0}N_{i0}(I_{i0,\gamma 1}+I_{\gamma 1,i0})/(2I_{\gamma 1,\gamma 1}). \tag{17}$$

An expansion coefficient $c_{i0,\gamma 1}$ expanding mode i1 from region 0 into mode $\gamma$1 in region 1 over the first abrupt step is:

$$C_{i0,\gamma 1}=a_{\gamma 1}/a_{i0}=N_{i0}(I_{i0,\gamma 1}+I_{\gamma 1,i0})/(2I_{\gamma 1,\gamma 1}N_{\gamma 1}). \tag{18}$$

At z=L, the expansion coefficients are derived in a similar manner to that detailed above resulting in:

$$C_{\gamma 1,i2}=(I_{\gamma 1,i2}+I_{i2,\gamma 1})\exp(-j(\beta_{\gamma 1}-\beta_{i2})L)/(2I_{i2,i2}). \tag{19}$$

Since, $$a_{\gamma 1}=c_{i0,\gamma 1}a_{i0}, \tag{20}$$

$$a_{i2}=c_{i0,\gamma 1}a_{i0}c_{\gamma 1,i2} \tag{20}$$

Or:

$$A_{i2}N_{i2}=c_{i0,\gamma 1}A_{i0}N_{i0}c_{\gamma 1,i2}. \tag{21}$$

And the transmittance through the composite plasmonic waveguide is obtained as:

$$T(z = L) = |A_{i2}/A_{i0}|^2 = \left|\sum_{\gamma=i,j,m} c_{i0,\gamma 1} c_{\gamma 1,i2}(N_{i0}/N_{i2})\right|^2, \quad (22)$$

Or:

$$T = |\Sigma_{\gamma 1=i,j,m} C_{\gamma 1} \exp(-i\alpha_{\gamma 1} L)|^2, \quad (23)$$

Where $C_{\gamma 1} = (I_{i0,\gamma 1} + I_{\gamma 1,i0})2/(4I_{i0,i0}I_{\gamma 1,\gamma 1})$ and L is the length of a gold overlayer.

The transmittance through the composite-plasmonic waveguide structure presented in the scheme of FIG. 3 can be calculated using (22) (or (23)).

It has been found that in the system 100 of the invention the flow of the light is smoothly directed around the cloaked space of invisibility 40, and is effective for a wide range of refractive indices and materials. The effectiveness of the cloak in terms of the optical properties of the object have also been checked. The inventors have found that the concealing effect is preserved for variety of materials, and this observation conforms with the concepts of transformation optics.

As described, the embodiment of FIG. 3 provides a new composite plasmonic waveguide scheme which includes a dialectic nano-spacer layer 152. The scheme is based on transformation optics principles, with elements that manipulate the light and distort the evanescent fields in a controllable manner, resulting in a space of invisibility 40 in which an object 138 can be concealed. The plasmonic metamaterial is placed on the composite plasmonic waveguide with Si nano-spacer. The high dielectric nano-spacer 152, which is made of Si, has contributed to the light confinement in the vicinity of the metamaterial-plate 132 boundaries, and facilitated the coupling to the hybrid plasmonic modes. The light manipulation is realized due to the engineered effective permittivity, which in turn avoids the scattering effect from object 138. The calculated results of the simulation demonstrate that the metamaterial plate 132 can deflect the evanescent wave into a predefined, analytically calculated pattern. Since plasmons are localized in the direction perpendicular to the metamaterial overlayer boundaries, and accompanied by the combination of the transverse and longitudinal electromagnetic fields, they have a maximum intensity on the surface with the metamaterial overlayer. The gradient properties of this metamaterial layer enable the invisibility effect to take place. The demonstration of the invisibility cloaking scheme in the system of the invention, enables an on-chip manipulation, and implementation of integrated on-chip devices that are based on the invention.

It should be emphasized that the waveguide 160, as well as the substrate 161 are only optional, as the waveguide 160 is merely a tool for radiating the bottom of the metamaterial plate 132. The nano-spacer 152 is also optional, as in the basic embodiment of the invention the nano-spacer merely amplifies the radiation that passes the metamaterial plate 132. In another embodiment, when the thickness of the nano-spacer is not homogeneous, it may assist in further diverting the light away from the space of invisibility (in additional to the effect of the metamaterial, that in some cases may achieve this object alone). The combination of the waveguide 160, together with the nano-spacer 152 provides an extremely challenging situation for verifying the applicability of the invention, as it ensures a very concentrated space 35 of secondary radiation 41 around the object 138, however, and as said, a space of invisibility 40 is also formed within this space 35 of concentrated radiation, as shown, for example in FIG. 4.

In addition to the above, the present invention is also characterized by:

a. While in some of the embodiments of the invention described above the nano-spacer layer serves in one or more of amplifying and/or diverting of the light away from the hiding space, the inclusion of nano-spacer is in fact optional, as the formation of the hiding space can be achieved by means of the metamaterial alone, as shown in FIG. 2a;

b. The nano-spacer may be made from various materials, as long as the selected material or combination of materials thereof result in a layer having a high refractive index in the frequency range of the radiating waves.

c. The nano-spacer layer has a thickness of a sub-wavelength relative to the radiating waves. In an embodiment of the invention where the wavelength of the radiating waves is longer, even several orders longer than the wavelength of light (for example, acoustic waves), the thickness of the nano-spacer layer may be higher than the nanometers order used in the example above.

d. While in the example above the metamaterial layer was made of gold, various of other materials may be used instead, as long as the real portion of the dielectric constant of the metamaterial is negative, or when plasmonic metamaterials are used.

e. Moreover, while the method and system of the invention were demonstrated for electromagnetic waves in the visual range of $\lambda_0=637$ nm, this should not be viewed as a limitation, as the invention may similarly be applied for concealing objects from a radiation in any electromagnetic, acoustic, or mechanical wavelengths, mutatis mutandis.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for creating a space of invisibility, comprising:
   providing a metamaterial plate having a subwavelength thickness, said metamaterial plate having bottom and top surfaces;
   radiating the bottom surface of the metamaterial plate by a primary radiation thereby to form a space of invisibility above the top surface of the metamaterial plate, said space of invisibility being located within a space of a secondary radiation above the metamaterial plate which is in turn formed as a result of said primary radiation passing through the metamaterial plate.

2. The method of claim 1 wherein any object which is positioned within said space of invisibility becomes invisible to a device which is positioned within any space above said metamaterial plate.

3. The method of claim 1 wherein the metamaterial plate becomes invisible in view of said primary and secondary radiations.

4. The method of claim 1 wherein the metamaterial plate comprises perforations.

5. The method of claim 4 further comprising providing of a spacer layer above said metamaterial plate.

6. The method of claim 4 wherein each of the perforations pass through both said metamaterial plate and the spacer above it.

7. The method of claim 1 wherein said radiation is performed by either electromagnetic or acoustic waves.

8. The method of claim 7 wherein said electromagnetic waves are in the light spectrum range.

9. The method of claim 8 wherein said light spectrum range is in the visible spectrum range.

10. The method of claim 9 wherein the metamaterial plate is made of gold.

11. The method of claim 10 wherein a nano-spacer layer which is made of silicon is provided above said metamaterial plate which is made of gold.

12. The method of claim 11 which includes perforations in the metamaterial plate and the nano-spacer layer, each of said perforations passes through both the meta-material plate and through the nano-spacer.

13. The method of claim 10 wherein said metamaterial plate lays on top of a waveguide, and wherein said primary radiation is a plasmonic radiation provided to the metamaterial plate via a top facet of the waveguide.

* * * * *